Patented Sept. 25, 1928.

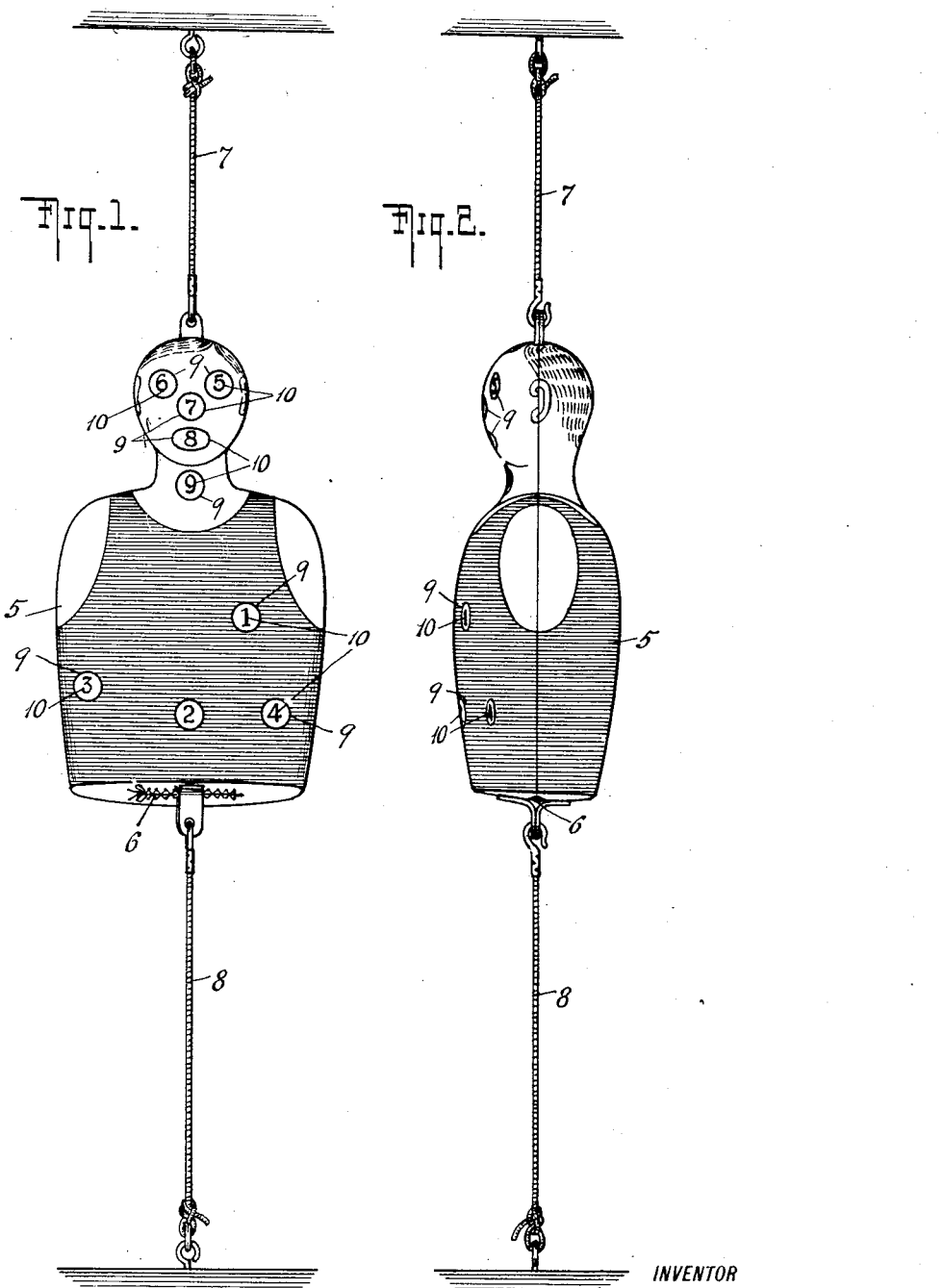

1,685,495

UNITED STATES PATENT OFFICE.

HARRY LATZ, OF NEW YORK, N. Y., ASSIGNOR TO HARRY LATZ SERVICE, INC., OF NEW YORK, N. Y., A CORPORATION OF NEW YORK.

DEVICE FOR CREATING ACCURACY IN THE ART OF BOXING.

Application filed May 11, 1927. Serial No. 190,395.

The invention relates to the art of boxing and more particularly to devices of the class commonly referred to as punching bags. Up to the present time these devices have been arranged and constructed principally for the purpose of developing speed in action and to provide a person with physical exercises in order to develop the muscles of the body. The object of the present invention is to provide a device of the class referred to which is designed for the purpose of creating boxing accuracy or, in other words, accuracy in delivering blows at predetermined points, and to develop in the boxing pupil a knowledge of where to hit to produce a maximum boxing efficiency. Other more specific objects will appear from the description hereinafter and the features of novelty will be pointed out in the claim.

In the accompanying drawing, which illustrates an example of the invention without defining its limits, Fig. 1 is an elevation showing the device suspended in its operative position and Fig. 2 is a side view thereof.

The device comprises a manikin or dummy preferably constructed to simulate the upper half of the human body and in its preferred form consisting of a casing 5 of flexible material open at the bottom as indicated at 6 to permit the introduction of a suitable stuffing whereby the dummy is given its intended shape. In its operative position the dummy is suspended for instance from the ceiling of a room by means of a suspending band 7 and preferably is connected with the floor of said room by a similar band 8; in order to increase the efficiency of the device for its intended purposes, the bands 7 and 8 may be elastic so as to provide for a quick return of the dummy subsequent to the delivering of a blow or a succession of blows. As shown in the drawing, designations are produced in the manikin or dummy to indicate striking points, these designations in the illustrated example comprising circles 9 preferably numbered as indicated at 10 and located to correspond to predetermined vital parts of a person's body.

In use the casing 5 of the manikin or dummy is stuffed with rags, paper or other suitable material to give it form and is then suspended in its operative position by means of the bands 7 and 8 or in any other suitable manner. The pupil will be required to consecutively or otherwise attempt to deliver blows upon the dummy at those points indicated by the designations 9, or in other words will be required to aim and hit the various points referred to. In this way accuracy in placing blows at predetermined points of the body will be developed to a maximum degree and at the same time the eyes of the pupil will be trained to easily and quickly locate the vital points on the human body of any subsequent opponent in a boxing encounter. With the aid of the instant device the boxing pupil will be trained to a high degree and may easily be taught to aim at different parts of the body such as the jaw, solar plexus, the heart and other vital points of the body. While the device illustrated and described herein will develop the muscles and speed of the pupil, it is intended primarily for the purpose of creating boxing accuracy and expert knowledge as to just where to deliver blows upon the human body most effectively. Because of its characteristics the device may be inexpensively produced and may be sold to the purchasing public as a part of a boxing course capable of being practiced and studied in the home and elsewhere.

It will, of course, be obvious that the physical characteristics of the dummy may be varied and that the stuffing may be replaced by other means for imparting the desired form to the dummy, without in any way interfering with the efficiency of the device for its intended purpose.

Various changes in the specific form shown and described may be made within the scope of the claim without departing from the spirit of the invention.

I claim:

A device for creating accuracy in boxing, comprising a stuffed casing shaped to simulate the upper portion of the human body, having an opening at the bottom thereof to permit the introduction of stuffing, means for supporting said casing comprising a member attached to the top thereof and a second member attached to the casing adjacent said opening, and numbered circles on said casing to indicate striking areas corresponding to vulnerable parts of the human body.

In testimony whereof I have hereunto set my hand.

HARRY LATZ.